US012617222B2

(12) United States Patent
Mukaida et al.

(10) Patent No.: US 12,617,222 B2
(45) Date of Patent: May 5, 2026

(54) MEDIUM TRANSPORT DEVICE AND RECORDING APPARATUS

(71) Applicant: SEIKO EPSON CORPORATION, Tokyo (JP)

(72) Inventors: Atsushi Mukaida, Matsumoto (JP); Akinobu Nakahata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 120 days.

(21) Appl. No.: 18/781,360

(22) Filed: Jul. 23, 2024

(65) Prior Publication Data

US 2025/0033392 A1 Jan. 30, 2025

(30) Foreign Application Priority Data

Jul. 24, 2023 (JP) ................................ 2023-119827

(51) Int. Cl.

*B65H 5/36* (2006.01)
*B41J 13/03* (2006.01)
*B41J 29/13* (2006.01)
*B65H 5/06* (2006.01)

(52) U.S. Cl.

CPC ............... *B41J 29/13* (2013.01); *B41J 13/03* (2013.01); *B65H 5/062* (2013.01); *B65H 2402/441* (2013.01)

(58) Field of Classification Search

CPC ........... B41J 29/13; B41J 13/03; B65H 5/062; B65H 5/36; B65H 2402/441
USPC ................................ 399/110, 117, 124, 125
See application file for complete search history.

(56) References Cited

U.S. PATENT DOCUMENTS

2016/0236489 A1* 8/2016 Nakano ................ B65H 3/0669
2019/0243300 A1* 8/2019 Matsuo .................... B41J 29/13
2021/0132537 A1 5/2021 Takagi et al.
2021/0356896 A1* 11/2021 Oshiro ............... G03G 21/1633
2022/0194084 A1* 6/2022 Nakahata ............ B41J 13/0009
2022/0281249 A1 9/2022 Wanibe et al.
2023/0055676 A1* 2/2023 Iizuka ...................... B41J 29/13
2023/0094884 A1* 3/2023 Misawa ............... B41J 2/16523 347/33

FOREIGN PATENT DOCUMENTS

JP 2011-032040 A 2/2011
JP 2012-118133 * 6/2012
JP 2021-070556 A 5/2021
JP 2022-135341 A 9/2022

* cited by examiner

*Primary Examiner* — Thomas A Morrison
(74) *Attorney, Agent, or Firm* — WORKMAN NYDEGGER

(57) ABSTRACT

In a state in which the first cover and the second cover are closed, an end portion of a first path forming member in a second direction and an end portion of a second path forming member in a first direction overlap each other when viewed from a medium width direction, the end portion of the first path forming member in the second direction is positioned in the second direction with respect to an end portion of the second cover in the first direction and the end portion of the second path forming member in the first direction is positioned in the second direction with respect to an end portion of the first cover in the second direction. When the closed first cover is opened, the end portion of the first path forming member in the second direction moves toward the inside of a medium transport device.

9 Claims, 12 Drawing Sheets

MEDIUM TRANSPORT DEVICE AND RECORDING APPARATUS

The present application is based on, and claims priority from JP Application Serial Number 2023-119827, filed Jul. 24, 2023, the disclosure of which is hereby incorporated by reference herein in its entirety.

BACKGROUND

1. Technical Field

The present disclosure relates to a medium transport device that transports a medium, and a recording apparatus including the same.

2. Related Art

JP-A-2021-070556 discloses an image forming device in which a rotatable cover is provided on a back surface of the image forming device, and when the cover is opened, a sheet transport path is exposed and jam processing can be performed. Further, JP-A-2011-032040 discloses an image forming device in which a fixed transport guide and a movable transport guide are provided, and a sheet transport path can be opened by opening the movable transport guide. Further, in the image forming device, a coupling portion between the fixed transport guide and the movable transport guide has a comb-toothed structure.

When the cover becomes larger in order to open a wider range of a sheet transport path, operability deteriorates and a large space is required to open the cover. Therefore, the cover may be divided in order to open a wider range of sheet transport path. Hereinafter, one of the adjacent covers will be referred to as a first cover, and the other cover will be referred to as a second cover. Further, it is necessary to provide path members such as the fixed transport guide and the movable transport guide described in JP-A-2011-032040 on an inner side of the cover. Hereinafter, the path member provided on the first cover will be referred to as a first path forming member, and the path member provided on the second cover will be referred to as a second path forming member.

In order for a sheet to advance from one of the first path forming member and the second path forming member to the other without being caught, it is necessary to employ a comb-toothed structure as described in JP-A-2011-032040. The comb-toothed structure is formed by the first path forming member protruding toward the second cover, and the second path forming member protruding toward the first cover. Therefore, a distal end of the first path forming member gets caught on the second cover when trying to open the first cover, and a distal end of the second path forming member gets caught on the first cover when trying to open the second cover. It is necessary to widen a gap between the first cover and the second cover in order to avoid such problems. However, with this configuration, dust and the like may easily enter the inside of the device through the gap between the first cover and the second cover.

SUMMARY

According to an aspect of the present disclosure, a medium transport device according to a first aspect includes: a housing; a transport path that is provided inside the housing and transports a medium in a transport direction including a first direction and a second direction opposite to the first direction; a first cover that is configured to rotate between an open state in which a part of the transport path is exposed and a closed state in which the transport path is not exposed; a second cover that is configured to rotate between an open state in which a part of the transport path is exposed and a closed state in which the transport path is not exposed, the second cover being disposed in the second direction with respect to the first cover in such a way as to be aligned with the first cover; a first path forming member that is provided on an inner side of the first cover and forms a part of the transport path; and a second path forming member that is provided on an inner side of the second cover, is positioned in the second direction with respect to the first path forming member, and forms a part of the transport path, in which an end portion of the first path forming member in the second direction and an end portion of the second path forming member in the first direction overlap each other in a state in which the first cover and the second cover are closed when viewed from a medium width direction intersecting the transport direction, the end portion of the first path forming member in the second direction is positioned in the second direction with respect to an end portion of the second cover in the first direction in a state in which the first cover and the second cover are closed, the end portion of the second path forming member in the first direction is positioned in the second direction with respect to an end portion of the first cover in the second direction in a state in which the first cover and the second cover are closed, and when the closed first cover is opened, the end portion of the first path forming member in the second direction moves toward an inside of the medium transport device.

According to an aspect of the present disclosure, a recording apparatus includes: a recording unit that performs recording on a medium; and the medium transport device.

DESCRIPTION OF EMBODIMENTS

Figure 1:
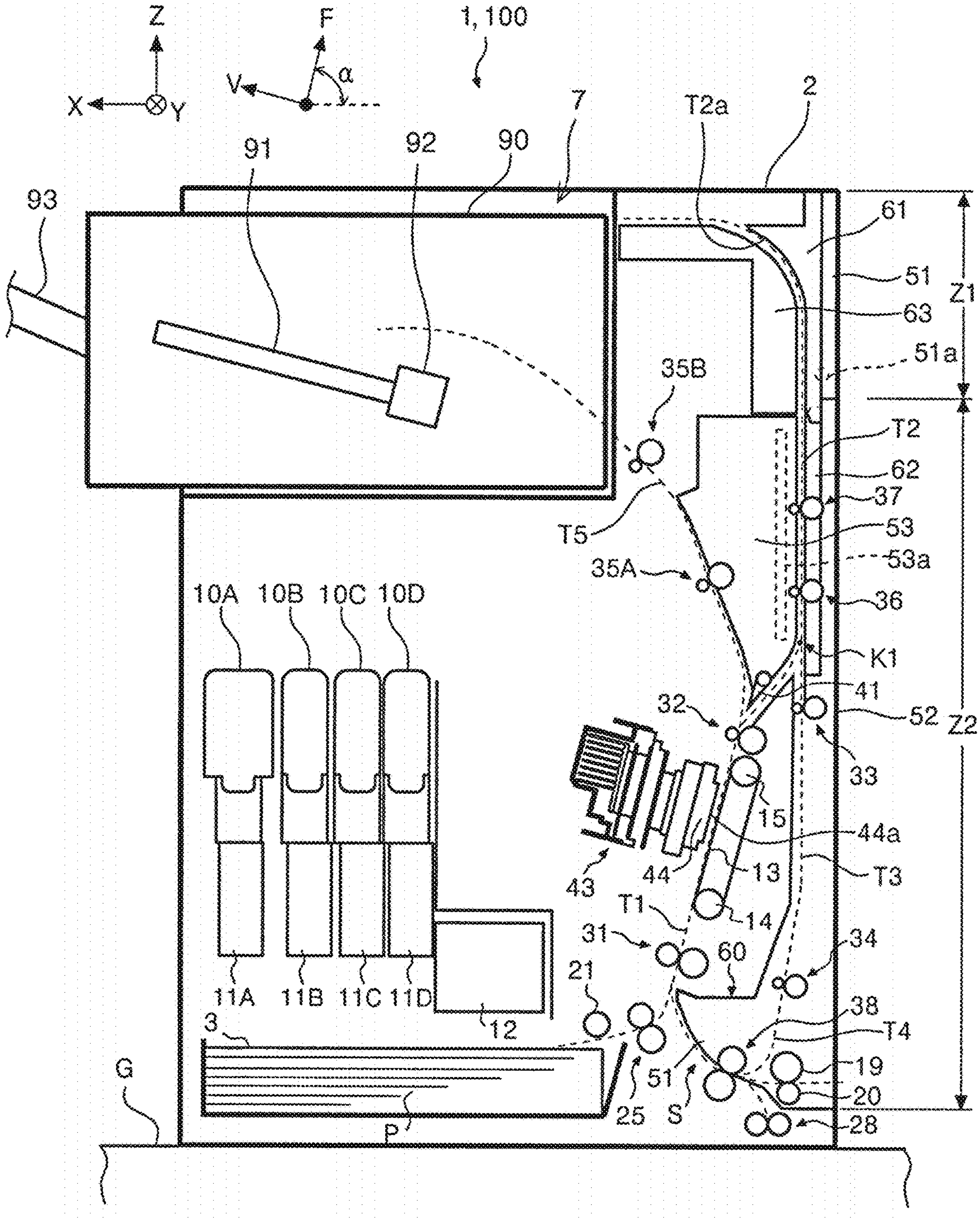
FIG. 1 is a view illustrating a medium transport path of a printer.

Hereinafter, the present disclosure will be schematically described. A medium transport device according to a first aspect includes: a housing; a transport path that is provided inside the housing and transports a medium in a transport direction including a first direction and a second direction opposite to the first direction; a first cover that is configured to rotate between an open state in which a part of the transport path is exposed and a closed state in which the transport path is not exposed; a second cover that is configured to rotate between an open state in which a part of the transport path is exposed and a closed state in which the transport path is not exposed, the second cover being disposed in the second direction with respect to the first cover in such a way as to be aligned with the first cover; a first path forming member that is provided on an inner side of the first cover and forms a part of the transport path; and a second path forming member that is provided on an inner side of the second cover, is positioned in the second direction with respect to the first path forming member, and forms a part of the transport path, in which an end portion of the first path forming member in the second direction and an end portion of the second path forming member in the first direction overlap each other in a state in which the first cover and the second cover are closed when viewed from a medium width direction intersecting the transport direction, the end portion of the first path forming member in the second direction is positioned in the second direction with respect to an end portion of the second cover in the first direction in a state in which the first cover and the second cover are closed, the end portion of the second path forming member in the first direction is positioned in the second direction with respect to an end portion of the first cover in the second direction in a state in which the first cover and the second cover are closed, and when the closed first cover is opened, the end portion of the first path forming member in the second direction moves toward an inside of the medium transport device.

According to the present aspect, a part of the first path forming member and a part of the second path forming member overlap each other in a state in which the first cover and the second cover are closed when viewed from the medium width direction. Therefore, it is possible to prevent the medium transported along the transport path from being caught on the first path forming member or the second path forming member. The end portion of the first path forming member in the second direction is positioned in the second direction with respect to the end portion of the second cover in the first direction in a state in which the first cover and the second cover are closed, and when the closed first cover is opened, the end portion of the first path forming member in the second direction moves toward the inside of the device. Therefore, the end portion of the first path forming member in the second direction does not interfere with the second cover when the first cover is opened, and the first cover can be opened and closed independently. Furthermore, the end portion of the second path forming member in the first direction is positioned in the second direction with respect to the end portion of the first cover in the second direction in a state in which the first cover and the second cover are closed. Therefore, the end portion of the second path forming member in the first direction does not interfere with the first cover when the second cover is opened, and the second cover can be opened and closed independently. As described above, interference between the members can be avoided when opening and closing the first cover and the second cover, and thus, there is no need to secure a large gap between the first cover and the second cover, and it is possible to prevent dust from entering the inside of the device.

According to a second aspect dependent on the first aspect, a protruding portion that protrudes in the second direction is provided at the end portion of the first path forming member in the second direction, a recessed portion that receives the protruding portion and has a bottom surface along the transport path is formed at the end portion of the second path forming member in the first direction, and when the protruding portion is fitted into the recessed portion in a state in which the first cover and the second cover are closed, a part of the first path forming member and a part of the second path forming member overlap each other when viewed from the medium width direction.

According to the present aspect, the protruding portion is fitted into the recessed portion in a state in which the first cover and the second cover are closed to substantially form a comb-toothed structure. Therefore, the medium is less likely to be caught when proceeding from one of the first path forming member and the second path forming member to the other one. Since the recessed portion has the bottom surface along the transport path, it is possible to prevent dust and the like from entering the inside of the device through a coupling portion between the first path forming member and the second path forming member.

According to a third aspect dependent on the first aspect, the first direction is a vertically upward direction and the second direction is a vertically downward direction, a vertical dimension of the second cover is larger than a vertical dimension of the first cover, an axis of rotation of the first cover is along the medium width direction, the first cover is opened and closed by rotating with an end portion of the first cover in the first direction as a free end, and an axis of rotation of the second cover is along a vertical direction.

In a configuration in which the vertical dimension of the second cover is larger than the vertical dimension of the first cover, when the second cover rotates with an upper end portion of the second cover as a free end, or when the second cover rotates with a lower end portion of the second cover as a free end, a large space is required for opening and closing. According to the present aspect, the axis of rotation of the second cover is along the vertical direction, and thus, a space required for opening and closing the second cover can be reduced. The present aspect is not limited to the first aspect and may be dependent on the second aspect.

According to a fourth aspect dependent on the third aspect, the first cover and the second cover are provided on a right side surface or left side surface of the housing, and the second cover is opened and closed by rotating with a front end portion of the second cover in a device depth direction as a free end.

According to the present aspect, the first cover and the second cover are provided on the right side surface or left side surface of the housing, and the second cover is opened and closed by rotating with the front end portion of the second cover in the device depth direction as a free end. Therefore, when the closed second cover is opened, the second cover is opened toward the rear of the device. As a result, when performing a jam processing operation by opening the second cover, it is less likely for the second cover to be an obstruction. The jam processing operation in the present specification means an operation of removing a jammed medium.

According to a fifth aspect dependent on the third aspect, a portion of the transport path is curved, the portion being formed by an end portion of the first path forming member in the first direction. According to the present aspect, the transport path is curved at the portion formed by the end portion of the first path forming member in the first direction, and therefore, a jam of the medium is likely to occur in the portion. However, since the first cover is opened and closed by rotating with the end portion of the first cover in the first direction as a free end, the curved portion is opened wide when the first cover is opened, so that the jam processing operation can be easily performed. The present aspect is not limited to the third aspect and may be dependent on the fourth aspect.

According to a sixth aspect dependent on the first aspect, the medium transport device further includes a third path forming member that is disposed to face the first path forming member and forms a part of the transport path, in which the third path forming member has a receiving portion that receives the end portion of the first path forming member in the second direction when the first cover is opened.

According to the present aspect, the third path forming member disposed to face the first path forming member has the receiving portion that receives the end portion of the first path forming member in the second direction when the first cover is opened. Therefore, it is possible to avoid collision between the end portion of the first path forming member in the second direction and the third path forming member when the first cover is opened. As a result, when there is a medium jammed between the first path forming member and the third path forming member, it is possible to prevent the end portion of the first path forming member in the second direction from biting into the medium when the first cover is opened. The present aspect is not limited to the first aspect and may be dependent on any one of the second to fifth aspects.

According to a seventh aspect dependent on the first aspect, the medium transport device further includes: a second transport path that is positioned further inside of the medium transport device than the transport path as a first transport path; and an inner door that faces the second path forming member and forms a part of the first transport path and a part of the second transport path, in which the inner door is configured to rotate between an open state in which a part of the second transport path is exposed and a closed state in which the second transport path is not exposed.

According to the present aspect, in a configuration in which the second transport path is provided further inside of the medium transport device than the first transport path, a part of the second transport path can be exposed by opening the inner door, and thus, the jam processing operation can be performed when the medium is jammed on the second transport path. The present aspect is not limited to the first aspect and may be dependent on any one of the second to sixth aspects.

According to an eighth aspect dependent on the seventh aspect, the inner door is disposed at a position where the inner door does not interfere with the first cover and the first path forming member when opened and closed. According to the present aspect, the inner door is disposed at a position where the inner door does not interfere with the first cover and the first path forming member when opened and closed. Therefore, the inner door can be opened and closed without opening the first cover, which improves usability of the device.

A recording apparatus according to a ninth aspect includes a recording unit that performs recording on a medium, and the medium transport device according to any one of first to eighth aspects. According to the present aspect, in the recording apparatus, effects of any one of the first to eighth aspects can be obtained.

Hereinafter, the present disclosure will be described in detail. An ink jet printer 1 that performs recording by ejecting ink, which is an example of a liquid, onto a medium, typically, recording paper, will be described below as an example of a recording apparatus. The ink jet printer 1 will be abbreviated as printer 1 below. A configuration of the printer 1 excluding a line head 44 described below can be regarded as a medium transport device 100 from the viewpoint of transporting a medium. The printer 1 includes the medium transport device 100 and the line head 44.

An X-Y-Z coordinate system illustrated in each drawing is an orthogonal coordinate system, and a Y-axis direction is a direction intersecting a medium transport direction, that is, a medium width direction, and is also a device depth direction. In the Y-axis direction, a +Y direction is a direction from a front surface of the device toward a back surface of the device, and a —Y direction is a direction from the back surface of the device to the front surface of the device. In the present embodiment, a tilt panel 8 (see FIGS. 2 to 5) included in an operation unit for performing various operation settings is provided on the front surface of the device, and the front surface of the device is a side surface on which the tilt panel 8 is provided among the side surfaces of the device.

An X-axis direction is a device width direction, and when viewed from an operator who directly faces the tilt panel 8, a +X direction is a left direction, and a −X direction is a right direction. A Z-axis direction is a vertical direction, and is a normal direction with respect to a mounting surface G of the printer 1, that is, a device height direction. In the Z-axis direction, a +Z direction is an upward direction, and a −Z direction is a downward direction. The +Z direction is an example of a first direction, and the −Z direction is an example of a second direction. Hereinafter, a direction in which the medium is sent may be referred to as “downstream”, and a direction opposite thereto may be referred to as “upstream”. In FIG. 1, a medium transport path is indicated by a broken line. In the printer 1, the medium is transported through the medium transport path indicated by the broken line in FIG. 1.

Further, an F-axis direction is a medium transport direction between the line head 44 and a transport belt 13, that is, in a recording region. A +F direction indicates downstream in the transport direction, and a −F direction indicates upstream in the transport direction. Further, a V-axis direction is a direction orthogonal to the F-axis direction.

The printer 1 is configured in such a way that an extension unit (not illustrated) can be coupled to a lower portion of a housing 2, and the medium can be fed from the extension unit. In FIG. 1, Reference Numeral 28 denotes a transport roller pair that sends the medium fed from the extension unit (not illustrated) to the inside of the housing 2. The printer 1 may be configured as a multifunction device including a scanner unit (not illustrated), which is an example of an image reading device, on the housing 2.

The housing 2 includes a first medium cassette 3 that is provided at a lower portion of the housing 2 and accommodates the medium. The first medium cassette 3 is provided with a pick roller 21 that sends the accommodated medium in the −X direction. The medium sent by the pick roller 21 is sent toward a transport roller pair 31 by a feeding roller pair 25. In the following description, unless otherwise specified, a "roller pair" includes a drive roller driven by a drive source (not illustrated) to apply a feeding force to the medium, and a driven roller that rotates in contact with the drive roller or the medium. A supply roller 19 and a separation roller 20 provided near a transport roller pair 38 are a roller pair that sends the medium from a supply tray which is not illustrated in FIG. 1.

The medium that receives the feeding force from the transport roller pair 31 is sent to a position between the line head 44, which is an example of a recording unit, and the transport belt 13, that is, a position that faces the line head 44. Hereinafter, the medium transport path from the transport roller pair 31 to a transport roller pair 32 is referred to as a recording transport path T1. The line head 44 is included in a head unit 43. The line head 44 performs recording by ejecting the ink onto a surface of the medium. The line head 44 is an ink ejection head configured in such a way that nozzles that eject the ink cover the entire region of the medium in the medium width direction, and is configured as an ink ejection head capable of performing recording across the entire region of the medium in the medium width direction without moving in the medium width direction. However, the ink ejection head is not limited thereto, and may be of a type that is mounted on a carriage and ejects the ink while moving in the medium width direction.

The head unit 43 is provided in such a way as to be movable forward and backward with respect to the recording transport path T1. The head unit 43 is provided in such a way as to be movable between a recording position where the head unit 43 advances into the recording transport path T1 and performs recording on the medium and a retreat position where the head unit 43 retreats from the recording transport path T1. FIG. 1 illustrates a state in which the head unit 43 is at the recording position, and recording is performed on the medium in this state.

Reference Numerals 10A, 10B, 10C, and 10D denote ink storage units as liquid storage units. The ink ejected from the line head 44 is supplied from each ink storage unit to the line head 44 via a tube (not illustrated). The ink storage units 10A, 10B, 10C, and 10D are detachably provided on mounting units 11A, 11B, 11C, and 11D, respectively. Reference Numeral 12 denotes a waste liquid storage unit that stores the ink as a waste liquid ejected from the line head 44 toward a flushing cap (not illustrated) for maintenance.

The transport belt 13 is an endless belt that is wound around a pulley 14 and a pulley 15, and rotates when at least one of the pulley 14 or the pulley 15 is driven by a motor (not illustrated). The medium is transported to a position facing the line head 44 while adhering to a belt surface of the transport belt 13. A known adhesion method such as air suction or electrostatic attraction may be employed for adhesion of the medium to the transport belt 13.

Here, the recording transport path T1 passing through the position facing the line head 44 intersects both a horizontal direction and the vertical direction, so that the medium is transported upward. That is, the F-axis direction intersects both the horizontal direction and the vertical direction. Therefore, an ejection surface 44*a* from which the ink is ejected in the line head 44 is also parallel to the F-axis direction and intersects both the horizontal direction and the vertical direction. In the present embodiment, an angle $\alpha$ formed by the F-axis direction and the horizontal direction is 75°. The angle $\alpha$ may be changed to other angles as appropriate within a range of $0° < \alpha \leq 90°$. For example, the angle $\alpha$ may be set within a range of $45° \leq \alpha \leq 80°$. In addition, $60° \leq \alpha \leq 80°$ for downsizing the printer 1.

The medium having a first surface on which recording is performed by the line head 44 is further transported upward by the transport roller pair 32 positioned downstream of the transport belt 13. A flap 41 is provided downstream of the transport roller pair 32, and the medium transport direction is switched by the flap 41. When sending the medium to a post-processing unit 90 described below, the medium is sent upward to a discharge path T5 by the flap 41. The medium sent to the discharge path T5 is sent to the post-processing unit 90 by a transport roller pair 35A and a transport roller pair 35B positioned downstream of the transport roller pair 35A.

When recording is performed on a second surface of the medium in addition to the first surface, the medium transport direction is changed to a direction toward a branch position K1 by the flap 41. The medium then passes through the branch position K1 and enters a switchback path T2. In the present embodiment, the switchback path T2 is a medium transport path above the branch position K1. The switchback path T2 is an example of a transport path that is provided inside the housing 2 and transports the medium in a transport direction including the +Z direction and the −Z direction. The transport direction including the +Z direction and the −Z direction opposite to the +Z direction does not need to be strictly parallel to the +Z direction and −Z direction, and it is sufficient if the transport direction including the +Z direction and the −Z direction includes a +Z-direction component or a −Z-direction component. The switchback path T2 has a curved path portion T2*a*, and the medium is curved at the curved path portion T2*a*.

Transport roller pairs 36 and 37 are provided in the switchback path T2. The medium that has entered the switchback path T2 is transported upward by the transport roller pairs 36 and 37, and once a lower edge of the medium passes the branch position K1, a rotation direction of the transport roller pairs 36 and 37 is switched, and the medium is transported downward accordingly.

A coupling path T3 is coupled to the switchback path T2. In the present embodiment, the coupling path T3 is a medium transport path that extends from the branch position K1 and reaches a transport roller pair 34. Further, a reversing path T4 is coupled to the coupling path T3. In the present embodiment, the reversing path T4 is a medium transport path that extends from the transport roller pair 34, passes through the transport roller pair 38, and reaches the transport roller pair 31. The reversing path T4 is a transport path positioned upstream of the position facing the line head 44, and is a transport path positioned vertically below the line head 44. Further, the reversing path T4 is a path portion that protrudes vertically downward, and is a path that curves the medium upward and reverses the medium. The medium transported downward from the branch position K1 receives the feeding force from the transport roller pairs 33 and 34, reaches the transport roller pair 38, is reversed, and is sent to the transport roller pair 31.

The second surface of the medium sent to the position facing the line head 44 again faces the line head 44, the second surface being opposite to the first surface on which recording has already been performed. Therefore, the line head 44 can perform recording on the second surface of the medium.

An upper portion of the switchback path T2 described above can be exposed by opening a first cover 51 described below, so that a jam processing operation can be performed.

A lower portion of the switchback path T2 can be exposed by opening a second cover 52 described below, so that the jam processing operation can be performed. A part of the discharge path T5 can be exposed by opening an inner door 53 described below, so that the jam processing operation can be performed.

Next, the medium transported through the discharge path T5 is discharged to an internal discharge section 7. The internal discharge section 7 is an internal space provided in the printer 1 for discharging the medium on which recording has been performed, and is a space that is opened in the −Y direction and the +X direction. The internal discharge section 7 overlaps a top surface of the housing 2 when viewed from the +Z direction. The post-processing unit 90 is provided in the internal discharge section 7. The post-processing unit 90 may be attachable to and detachable from the internal discharge section 7. Further, when the post-processing unit 90 is not mounted, a discharge tray (not illustrated) can be mounted in place of the post-processing unit 90.

The post-processing unit 90 includes a processing tray 91, and the medium discharged through the discharge path T5 is temporarily stacked on the processing tray 91. The media stacked on the processing tray 91 can be subjected to binding processing by a post-processing portion 92. The media subjected to the binding processing are discharged toward a stacking tray 93 by a discharge unit (not illustrated) and stacked on the stacking tray 93. The binding processing using a stapler is an example of post-processing, and the post-processing is not limited to the binding processing and may include other types of processing such as punching processing of punching holes in media, saddle stitching processing of saddle stitching a media bundle, and shift discharge processing of discharging media bundles while alternately shifting discharge positions of media bundles in the medium width direction.

Figure 2:
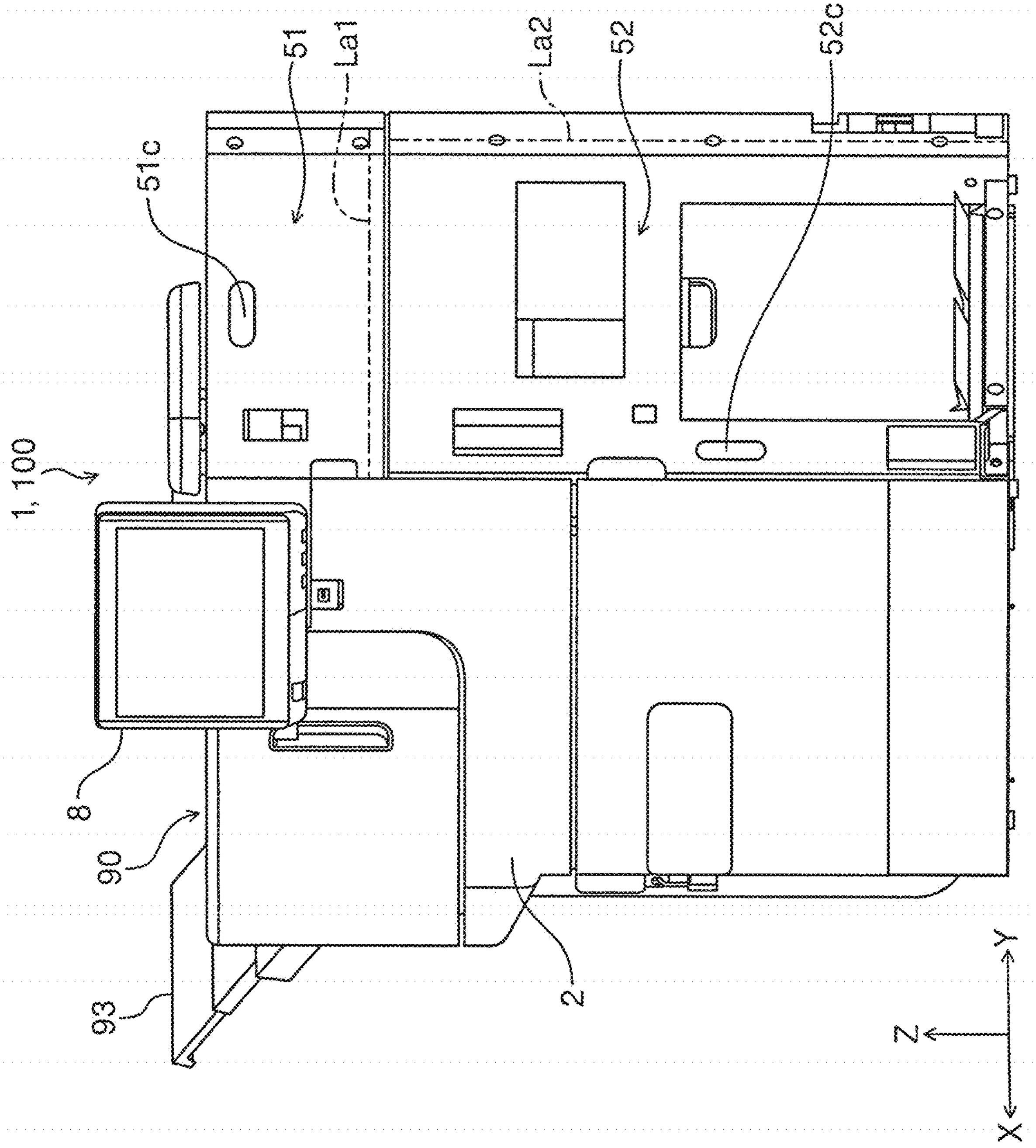
FIG. 2 is an external perspective view of the printer with a first cover and a second cover closed.

Next, the first cover 51 and the second cover 52 will be described with reference to FIG. 2 and subsequent drawings. The printer 1 includes the first cover 51 provided on a right side surface of the printer 1, and the second cover 52 provided below the first cover 51.

Figure 9:
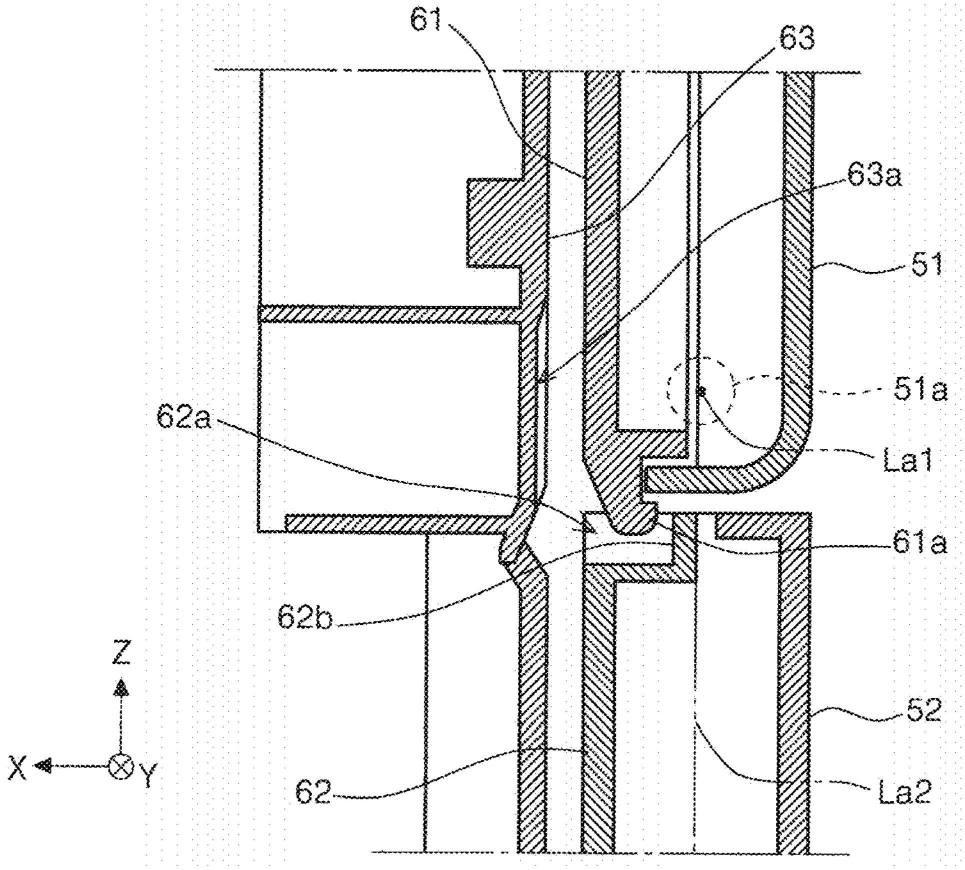
FIG. 9 is a cross-sectional view of main parts of the first path forming member, the second path forming member, and the third path forming member.

The first cover 51 is a cover that is rotatable around a rotation shaft 51*a* (FIGS. 1 and 9). In FIG. 2, Symbol La1 indicates a shaft center line of the rotation shaft 51*a*, that is, an axis of rotation of the first cover 51. In the present embodiment, the axis La1 is parallel to a Y axis. The first cover 51 is rotatable between an open state (FIGS. 3 and 5) in which a part of the switchback path T2 is exposed and a closed state (FIGS. 2 and 4) in which the switchback path T2 is not exposed. The rotation shaft 51*a* of the first cover 51 is provided near an end portion of the first cover 51 in the −Z direction, so that an end portion of the first cover 51 in the +Z direction serves as a free end during rotation. A grip portion 51*c* is provided near the end portion of the first cover 51 in the +Z direction, and the first cover 51 can be opened by inserting a finger into the grip portion 51*c*.

The second cover 52 is a cover that is rotatable around two hinge portions 52*a* (FIG. 4), and is disposed in the −Z direction with respect to the first cover 51. In FIG. 2, Symbol La2 indicates an axis of rotation of the second cover 52. In the present embodiment, the axis La2 is parallel to a Z axis. The second cover 52 is rotatable between an open state (FIG. 4) in which a part of the switchback path T2 is exposed and a closed state (FIGS. 2 and 3) in which the switchback path T2 is not exposed. The hinge portions 52*a* of the second cover 52 are provided near an end portion of the second cover 52 in the +Y direction, so that an end portion of the second cover 52 in the −Y direction serves as a free end during rotation. A grip portion 52*c* is provided near the end portion of the second cover 52 in the −Y direction, and the second cover 52 can be opened by inserting a finger into the grip portion 52*c*.

Figure 4:
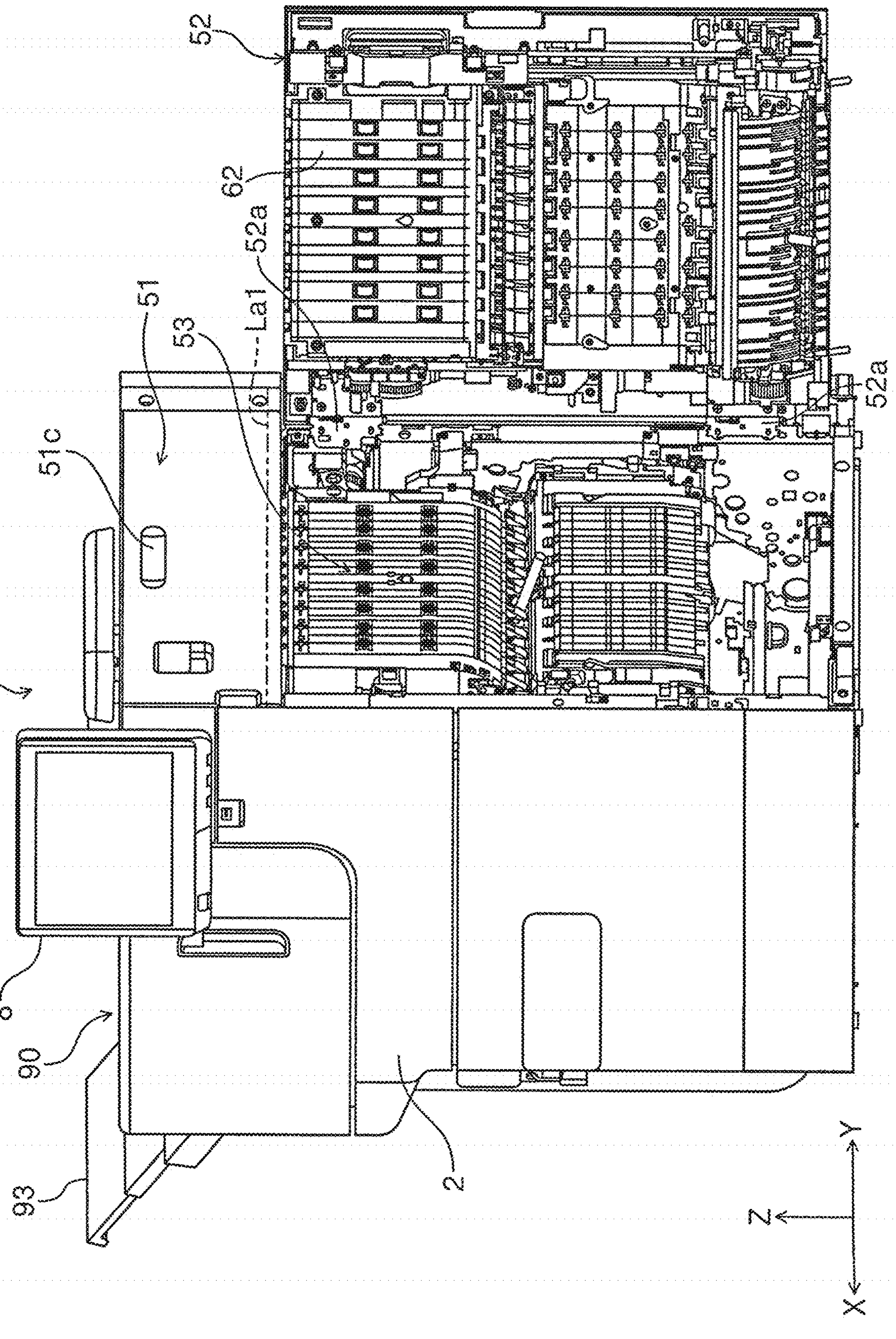
FIG. 4 is an external perspective view of the printer with the first cover closed and the second cover opened.
Figure 5:
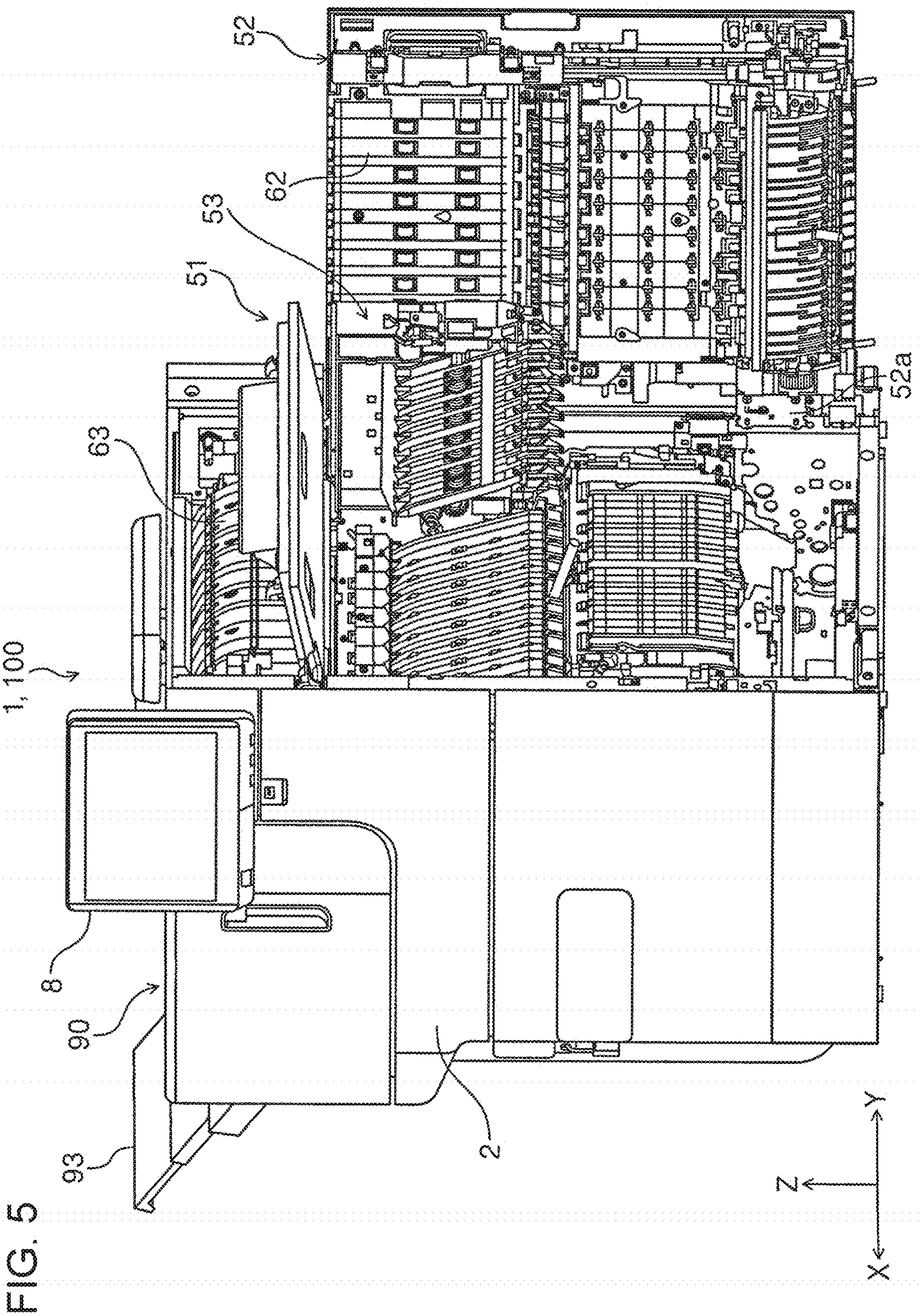
FIG. 5 is an external perspective view of the printer with the first cover, the second cover, and an inner door opened.

The inner door 53 is provided on an inner side of the second cover 52 as illustrated in FIGS. 4 and 5. The inner door 53 is an opening/closing body rotatable around a rotation shaft 53*a* (FIG. 1), and is disposed further toward the −Z direction than positions of the first cover 51 and a first path forming member 61 described below. In the present embodiment, a shaft center line of the rotation shaft 53*a* is parallel to the Z axis. The inner door 53 is rotatable between an open state (FIG. 5) in which a part of the discharge path T5 is exposed and a closed state (FIG. 4) in which the discharge path T5 is not exposed. The rotation shaft 53*a* of the inner door 53 is provided near an end portion of the inner door 53 in the +Y direction, so that an end portion of the inner door 53 in the −Y direction serves as a free end during rotation. The inner door 53 can be opened and closed in a state in which the second cover 52 is opened regardless of whether the first cover 51 is opened or closed.

The inner door 53 forms a part of the switchback path T2 and also forms a part of the discharge path T5. When the inner door 53 is opened, a part of the discharge path T5 is exposed. Thereby, when a jam occurs in the discharge path T5, the jam processing operation can be performed.

The first path forming member 61 that forms a part of the switchback path T2 is provided integrally with the first cover 51 on an inner side of the first cover 51. Further, a second path forming member 62 that is positioned in the −Z direction with respect to the first path forming member 61 and forms a part of the switchback path T2 is provided integrally with the second cover 52 on the inner side of the second cover 52.

When the first cover 51 is opened, the upper portion of the switchback path T2, particularly, the curved path portion T2*a* (FIG. 1), is exposed. Thereby, when a jam occurs at the upper portion of the switchback path T2, the jam processing operation can be performed. When the second cover 52 is opened, the lower portion of the switchback path T2 is exposed. Thereby, when a jam occurs at the lower portion of the switchback path T2, the jam processing operation can be performed. When the second cover 52 is opened, a nip of the transport roller pairs 36 and 37 is opened.

Figure 6:
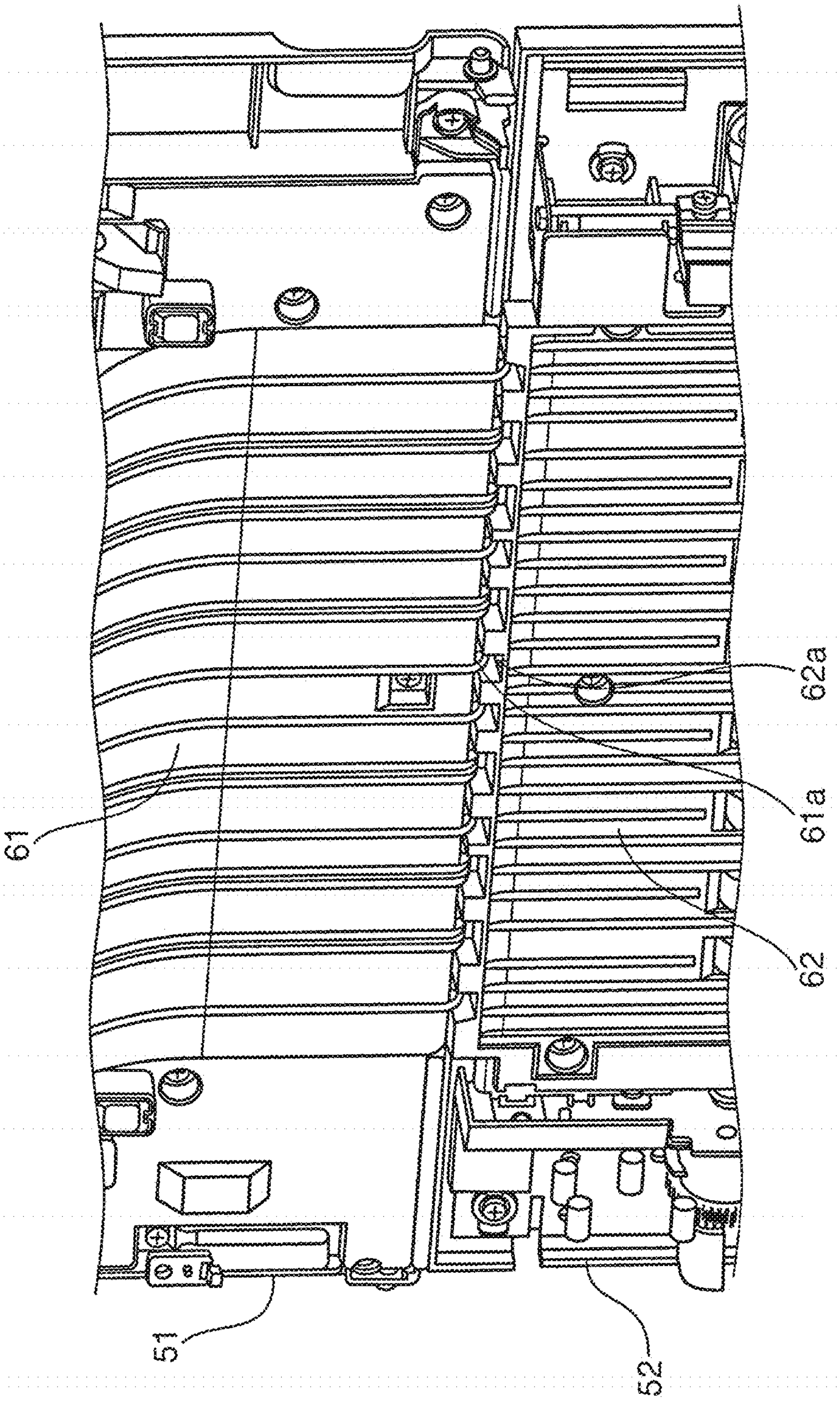
FIG. 6 is a perspective view of a first path forming member and a second path forming member with the first cover and the second cover closed.
Figure 7:
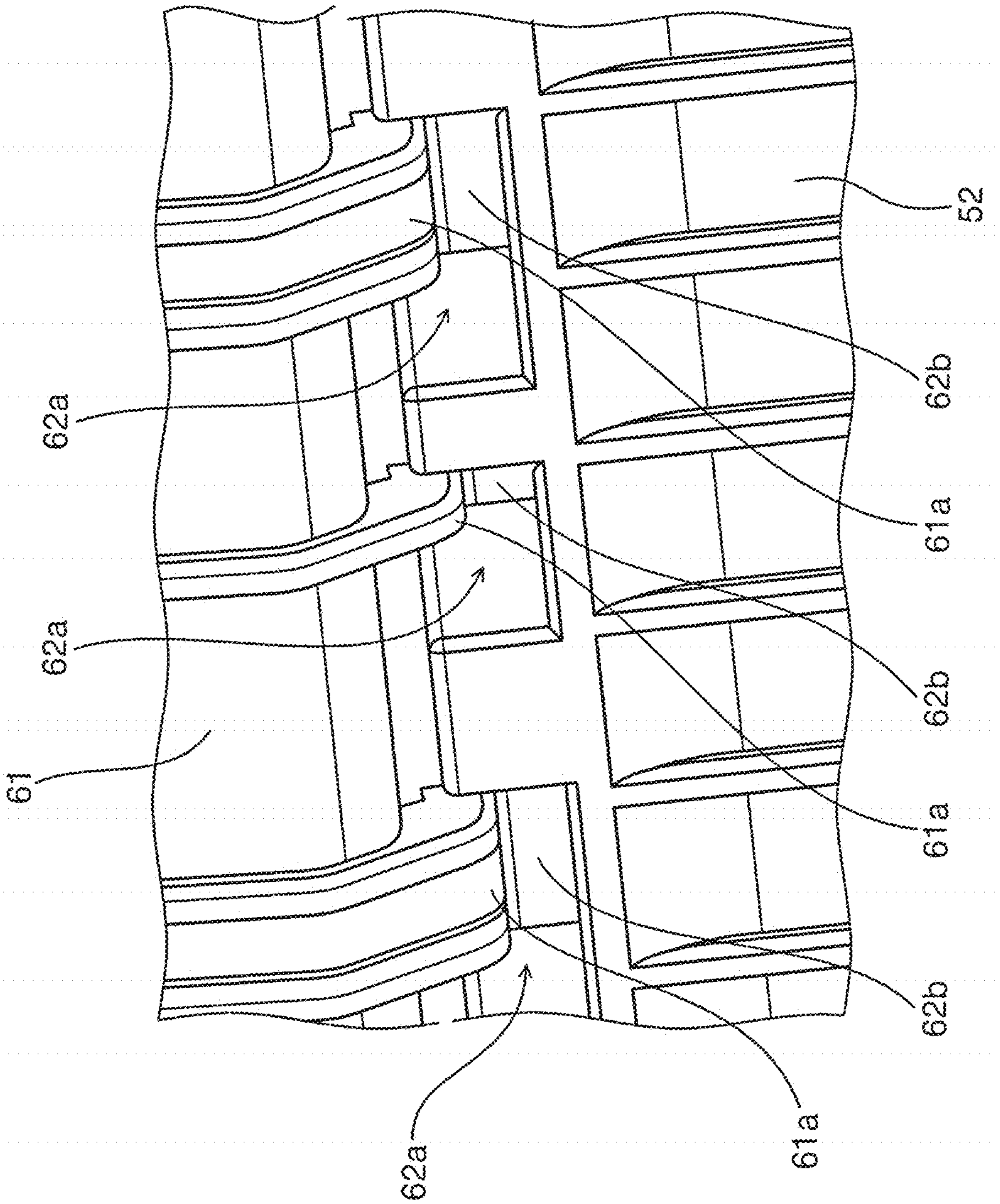
FIG. 7 is an enlarged perspective view of a coupling portion between the first path forming member and the second path forming member.

As illustrated in FIGS. 6 and 7, the first path forming member 61 has a protruding portion 61*a* that protrudes toward the second path forming member 62 at an end portion in the −Z direction. A plurality of protruding portions 61*a* are provided at appropriate intervals in the Y-axis direction, that is, the medium width direction. Further, as illustrated in FIGS. 6 and 7, the second path forming member 62 has a recessed portion 62*a* at an end portion in the +Z direction. A plurality of recessed portions 62*a* are provided at appropriate intervals in the Y-axis direction, that is, the medium width direction. The recessed portion 62*a* can receive the protruding portion 61*a* when the first cover 51 and the second cover 52 are closed.

Figure 12:
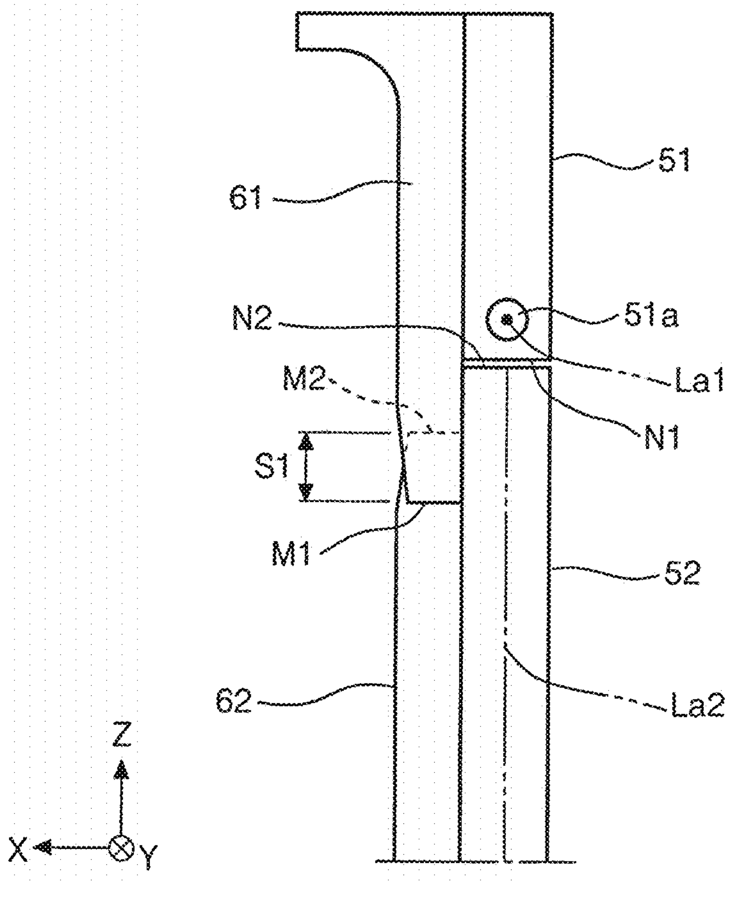
FIG. 12 is a view schematically illustrating main parts of the first cover, the second cover, the first path forming member, and the second path forming member.

With such a configuration, when viewed from the medium width direction, an end portion of the first path forming member 61 in the −Z direction, which is a part of the first path forming member 61, and the end portion of the second path forming member 62 in the +Z direction, which is a part of the second path forming member 62, overlap each other as indicated by Reference Numeral S1 in FIG. 12. That is, the end portion of the first path forming member 61 in the −Z direction and the end portion of the second path forming member 62 in the +Z direction form a comb-toothed structure. As a result, it is possible to prevent a leading edge of the medium from getting caught on the first path forming member 61 when moving from the −Z direction to the +Z direction.

The first cover 51 can be opened and closed independently regardless of whether the second cover 52 is opened or closed. Similarly, the second cover 52 can be opened and closed independently regardless of whether the first cover 51 is opened or closed. This will be described in detail below.

Figure 11:
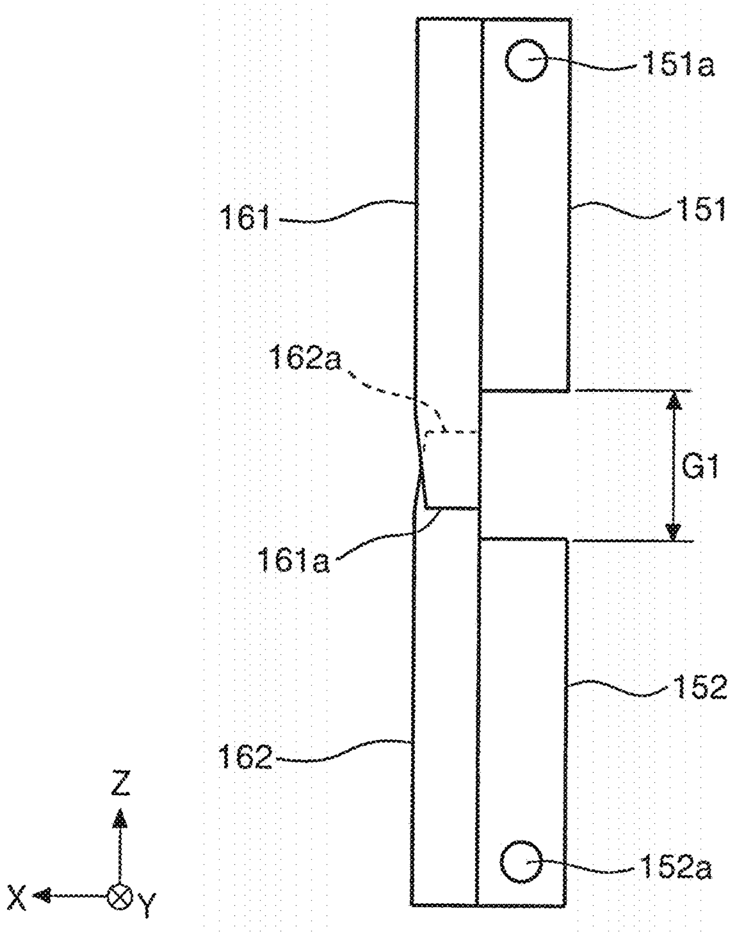
FIG. 11 is a view schematically illustrating a first cover, a second cover, a first path forming member, and a second path forming member according to a comparative example.

FIG. 11 is a view for describing problems to be solved by the printer 1 according to the present embodiment, and is a comparative example for the present embodiment. In FIG. 11, Reference Numerals 151, 152, 161, and 162 correspond to the first cover 51, the second cover 52, the first path forming member 61, and the second path forming member 62 described above, respectively. In the comparative example of FIG. 11, a rotation shaft 151*a* of a first cover 151 is provided near an end portion of the first cover 151 in the +Z direction, and the first cover 151 rotates with an end portion of the first cover 151 in the −Z direction as a free end. A shaft center line of the rotation shaft 151*a* is parallel to the Y axis. Further, a rotation shaft 152*a* of a second cover 152 is provided near an end portion of the second cover 152 in the −Z direction, and the second cover 152 rotates with an end portion of the second cover 152 in the +Z direction as a free end. A shaft center line of the rotation shaft 152*a* is parallel to the Y axis.

A portion of a first path forming member 161 and a portion of a second path forming member 162 that face each other have a comb-toothed structure, similarly to the above-described first path forming member 61 and second path forming member 62. Reference Numeral 161*a* denotes protruding portions provided at an end portion of the first path forming member 161 in the −Z direction. Reference Numeral 162*a* denotes protruding portions provided at an end portion of the second path forming member 162 in the +Z direction. The protruding portions 161*a* and the protruding portions 162*a* are alternately positioned in the Y-axis direction, that is, the medium width direction, and form the comb-toothed structure.

Such a comb-toothed structure is necessary in order for a leading edge of a medium to proceed from one of the first path forming member 161 and the second path forming member 162 to the other without being caught. However, the protruding portion 161*a* of the first path forming member 161 may be caught on the second cover 152 when the first cover 151 is opened, and the protruding portion 162*a* of the second path forming member 162 may be caught on the first cover 151 when the second cover 152 is opened. Therefore, it is necessary to secure a gap G1 between the first cover 151 and the second cover 152 as illustrated in FIG. 11 in order to avoid such a problem. However, with this configuration, dust and the like may easily enter the inside of the device through the gap G1.

Therefore, in the present embodiment, the gap G1 between the first cover 151 and the second cover 152 is made smaller while ensuring the comb-toothed structure with the following configuration. As illustrated in FIG. 12, in a state in which the first cover 51 and the second cover 52 are closed, an end portion M1 of the first path forming member 61 in the −Z direction, that is, the end portion M1 of the protruding portion 61*a*, is positioned in the −Z direction with respect to an end portion N2 of the second cover 52 in the +Z direction. In addition, in a state in which the first cover 51 and the second cover 52 are closed, an end portion M2 of the second path forming member 62 in the +Z direction is positioned in the −Z direction with respect to an end portion N1 of the first cover 51 in the −Z direction. When the closed first cover 51 is opened, the end portion M1 of the first path forming member 61 in the −Z direction moves in the +X direction, that is, toward the inside of the device. This is because the rotation shaft 51*a* is along the Y-axis direction and the end portion M1 is positioned lower than the rotation shaft 51*a*.

In a state in which the first cover 51 and the second cover 52 are closed as described above, the end portion M1 of the first path forming member 61 is positioned in the −Z direction with respect to the end portion N2 of the second cover 52 in the +Z direction, and when the closed first cover 51 is opened, the end portion M1 of the first path forming member 61 moves toward the inside of the device. Therefore, the end portion M1 of the first path forming member 61 does not interfere with the second cover 52 when the first cover 51 is opened, and the first cover 51 can be opened and closed independently. Furthermore, in a state in which the first cover 51 and the second cover 52 are closed, the end portion M2 of the second path forming member 62 is positioned in the −Z direction with respect to the end portion N1 of the first cover 51. Therefore, the end portion M2 of the second path forming member 62 does not interfere with the first cover 51 when the second cover 52 is opened, and the second cover 52 can be opened and closed independently. As described above, interference between the members can be avoided when opening and closing the first cover 51 and the second cover 52, and thus, there is no need to secure a large gap between the first cover 51 and the second cover 52, and it is possible to prevent dust and the like from entering the inside of the device.

Further, in the present embodiment, the recessed portion 62*a* formed in the second path forming member 62 has a bottom surface 62*b* along the switchback path T2 as illustrated in FIGS. 7 and 9. Therefore, it is possible to prevent dust and the like from entering the inside of the device through a coupling portion between the first path forming member 61 and the second path forming member 62 in a state in which the first cover 51 and the second cover 52 are closed. However, instead of providing the recessed portion 62*a* at the end portion of the second path forming member 62 in the +Z direction, a protruding portion (not illustrated) that protrudes in the +Z direction may be provided and form a comb-toothed structure together with the protruding portion 61*a* of the first path forming member 61.

Further, as illustrated in FIG. 1, in the present embodiment, a vertical dimension Z2 of the second cover 52 is larger than a vertical dimension Z1 of the first cover 51. Further, the axis La1 (see FIG. 2) of rotation of the first cover 51 is along the Y-axis direction, that is, the medium width direction, and the first cover 51 is opened and closed by rotating with the end portion in the +Z direction as a free end. The axis La2 (see FIG. 2) of rotation of the second cover 52 is along the vertical direction. As a result, the following effects can be obtained. That is, with a configuration in which the vertical dimension Z2 of the second cover 52 is larger than the vertical dimension Z1 of the first cover 51, a space required for opening and closing becomes large when the axis La2 of rotation of the second cover 52 is along the Y-axis direction and the second cover 52 rotates with an upper end portion of the second cover 52 as a free end or with a lower end portion of the second cover 52 as a free end. However, according to the present embodiment, the axis La2 of rotation of the second cover 52 is along the vertical direction, a space required for opening and closing the second cover 52 can be reduced.

Further, the second cover 52 is opened and closed by rotating in the Y-axis direction, that is, the device depth direction, with the end portion of the second cover 52 in the −Y direction, that is, a front end portion of the second cover 52, as a free end. As a result, when the closed second cover 52 is opened, the second cover 52 is opened toward the rear of the device, and when performing the jam processing operation by opening the second cover 52, it is less likely for the second cover 52 to be an obstruction.

In the present embodiment, the first cover 51 and the second cover 52 are provided on the right side surface of the device. However, the first cover 51 and the second cover 52 may also be provided on a left side surface of the device, the back surface of the device, or the front surface of the device. The second cover 52 may also be configured to be opened and closed by rotating with a rear end portion of the second cover 52 in the device depth direction as a free end. The axis La2 of rotation of the second cover 52 may be parallel to the Y-axis direction. In this case, the free end of the second cover 52 may be an end portion of the second cover 52 in the +Z direction or the −Z direction.

Further, in the present embodiment, the switchback path T2 is curved at a portion formed by an end portion of the first path forming member 61 in the +Z direction, and the portion is the curved path portion T2*a*. Therefore, a jam of the medium is likely to occur at the curved path portion T2*a*. However, the first cover 51 is opened and closed by rotating with the end portion of the first cover 51 in the +Z direction as a free end, and thus, when the first cover 51 is opened, the curved path portion T2*a* is opened wide, so that the jam processing operation can be easily performed.

Figure 3:
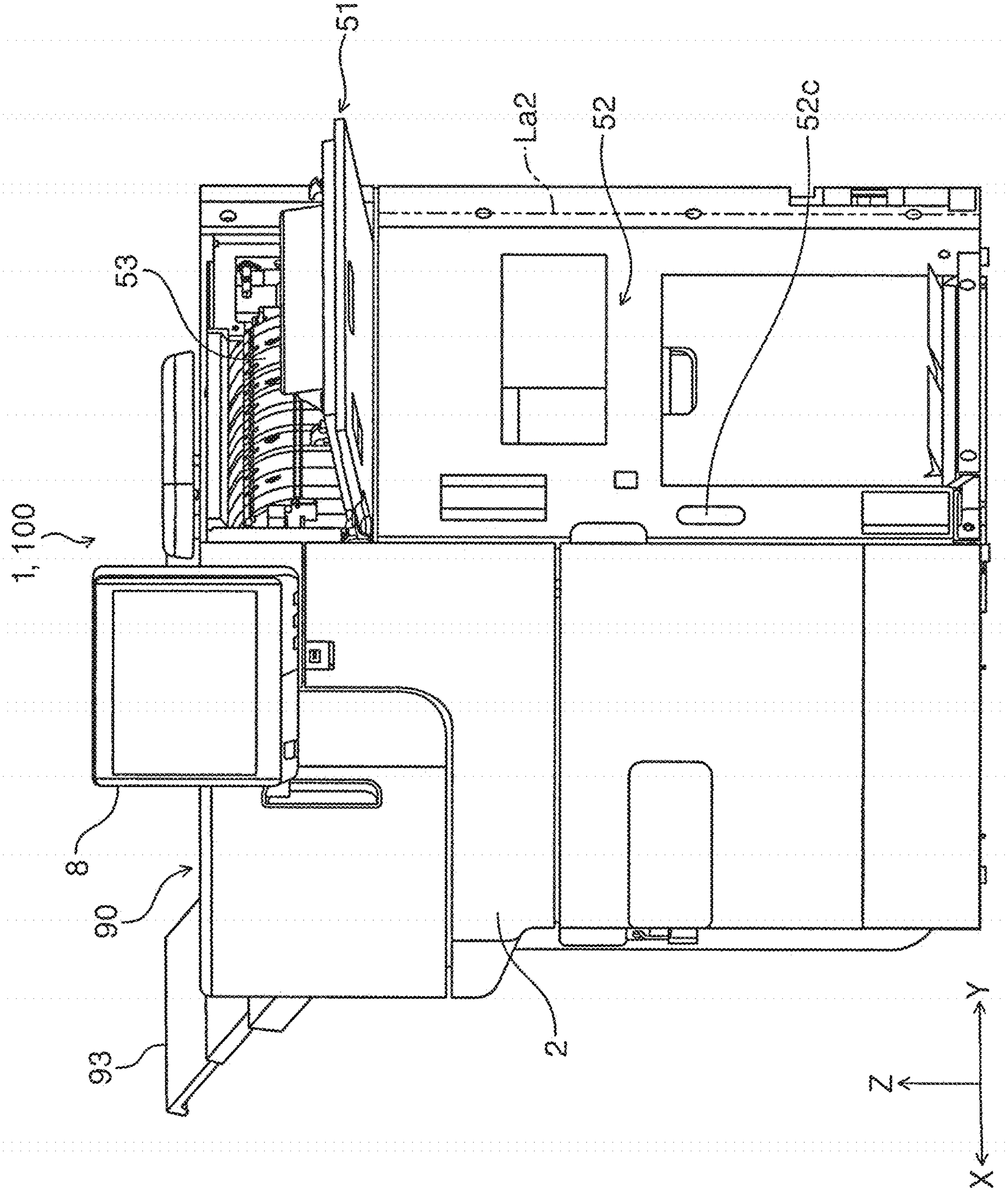
FIG. 3 is an external perspective view of the printer with the first cover opened and the second cover closed.
Figure 8:
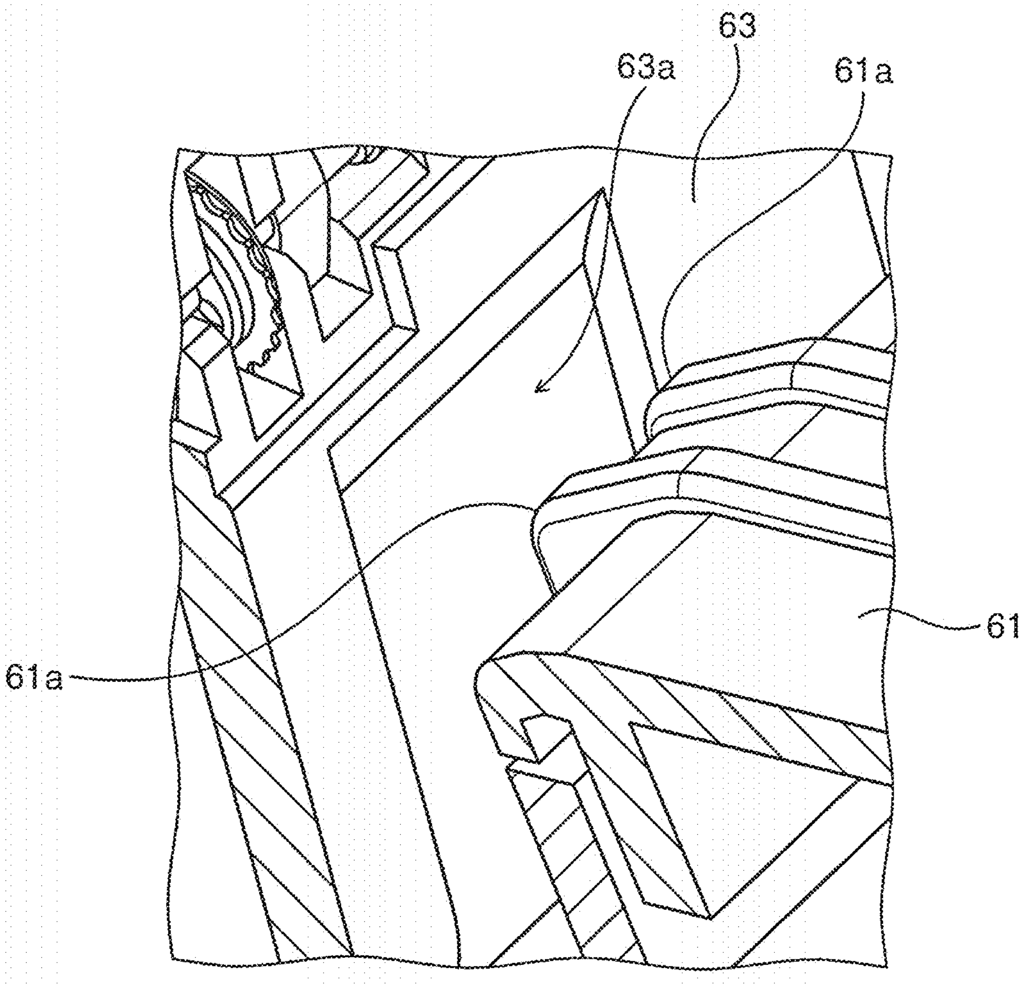
FIG. 8 is an enlarged view of a protruding portion of the first path forming member and a receiving portion of a third path forming member.
Figure 10:
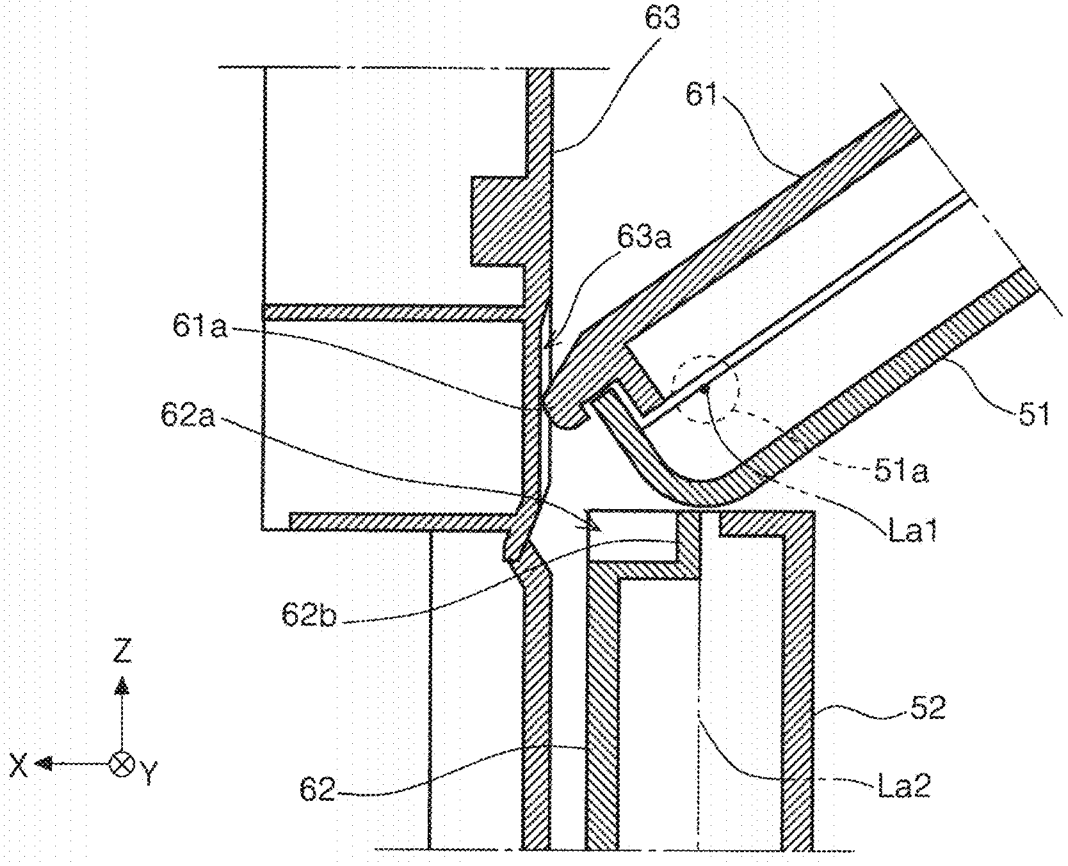
FIG. 10 is a cross-sectional view of main parts of the first path forming member, the second path forming member, and the third path forming member.

Next, a third path forming member 63, which is a member disposed to face the first path forming member 61 and forms a part of the switchback path T2, will be described. When the first cover 51 is opened as illustrated in FIGS. 3 and 5, the third path forming member 63 is exposed. As illustrated in FIGS. 8, 9, and 10, the third path forming member 63 has a receiving portion 63*a* that receives the protruding portion 61*a*, which is the end portion of the first path forming member 61 in the −Z direction, when the first cover 51 is opened.

The receiving portion 63*a* is formed to be recessed in the +X direction. The receiving portion 63*a* is provided at a position corresponding to the protruding portion 61*a* in the Y-axis direction, that is, the medium width direction. Thereby, the protruding portion 61*a* of the first path forming member 61 can be prevented from colliding with the third path forming member 63 when the first cover 51 is opened. As a result, when there is a medium jammed between the first path forming member 61 and the third path forming member 63, it is possible to prevent the protruding portion 61*a* of the first path forming member 61 from biting into the medium when the first cover 51 is opened.

Next, the inner door 53 will be further described. When the switchback path T2 is a first transport path, a second transport path is provided further inside the device than the first transport path. In the present embodiment, the second transport path is the discharge path T5. In other words, the second transport path is positioned in the +X direction with respect to the first transport path. The inner door 53 is an opening/closing body that faces the second path forming member 62, and forms a part of the switchback path T2 and a part of the discharge path T5. It is possible to perform the jam processing operation by opening the inner door 53 when the medium is jammed in the discharge path T5. Here, the inner door 53 is disposed at a position where the inner door 53 does not interfere with the first cover 51 and the first path forming member 61 when opened and closed. Specifically, the inner door 53 is disposed in the −Z direction with respect to the first cover 51 and the first path forming member 61. As a result, the inner door 53 can be opened and closed without opening the first cover 51, which improves usability of the device.

It goes without saying that the present disclosure is not limited to the embodiments and modified examples described above, that a variety of modifications is possible within the scope of the present disclosure described in the claims, and that the modifications also fall within the scope of the present disclosure.

What is claimed is:

1. A medium transport device comprising:

a housing;

a transport path that is provided inside the housing and transports a medium in a transport direction including a first direction and a second direction opposite to the first direction;

a first cover that is configured to rotate between an open state in which a part of the transport path is exposed and a closed state in which the transport path is not exposed;

a second cover that is configured to rotate between an open state in which a part of the transport path is exposed and a closed state in which the transport path is not exposed, the second cover being disposed in the second direction with respect to the first cover in such a way as to be aligned with the first cover;

a first path forming member that is provided on an inner side of the first cover and forms a part of the transport path; and a second path forming member that is provided on an inner side of the second cover, is positioned in the second direction with respect to the first path forming member, and forms a part of the transport path, wherein an end portion of the first path forming member in the second direction and an end portion of the second path forming member in the first direction overlap each other in a state in which the first cover and the second cover are closed when viewed from a medium width direction intersecting the transport direction, the end portion of the first path forming member in the second direction is positioned in the second direction with respect to an end portion of the second cover in the first direction in a state in which the first cover and the second cover are closed, the end portion of the second path forming member in the first direction is positioned in the second direction with respect to an end portion of the first cover in the second direction in a state in which the first cover and the second cover are closed, and when the closed first cover is opened, the end portion of the first path forming member in the second direction moves toward an inside of the medium transport device.

2. The medium transport device according to claim 1, wherein a protruding portion that protrudes in the second direction is provided at the end portion of the first path forming member in the second direction, a recessed portion that receives the protruding portion and has a bottom surface along the transport path is formed at the end portion of the second path forming member in the first direction, and when the protruding portion is fitted into the recessed portion in a state in which the first cover and the second cover are closed, a part of the first path forming member and a part of the second path forming member overlap each other when viewed from the medium width direction.

3. The medium transport device according to claim 1, wherein the first direction is a vertically upward direction and the second direction is a vertically downward direction, a vertical dimension of the second cover is larger than a vertical dimension of the first cover, an axis of rotation of the first cover is along the medium width direction, the first cover is opened and closed by rotating with an end portion of the first cover in the first direction as a free end, and an axis of rotation of the second cover is along a vertical direction.

4. The medium transport device according to claim 3, wherein the first cover and the second cover are provided on a right side surface or left side surface of the housing, and the second cover is opened and closed by rotating with a front end portion of the second cover in a device depth direction as a free end.

5. The medium transport device according to claim 3, wherein a portion of the transport path is curved, the portion being formed by an end portion of the first path forming member in the first direction.

6. The medium transport device according to claim 1, further comprising a third path forming member that is disposed to face the first path forming member and forms a part of the transport path, wherein the third path forming member has a receiving portion that receives the end portion of the first path forming member in the second direction when the first cover is opened.

7. The medium transport device according to claim 1, further comprising:

a second transport path that is positioned further inside of the medium transport device than the transport path as a first transport path; and an inner door that faces the second path forming member and forms a part of the first transport path and a part of the second transport path, wherein the inner door is configured to rotate between an open state in which a part of the second transport path is exposed and a closed state in which the second transport path is not exposed.

8. The medium transport device according to claim 7, wherein the inner door is disposed at a position where the inner door does not interfere with the first cover and the first path forming member when opened and closed.

9. A recording apparatus comprising:

a recording unit that performs recording on a medium; and the medium transport device according to claim 1.

* * * * *